United States Patent [19]

Codina et al.

[11] Patent Number: 5,670,721

[45] Date of Patent: Sep. 23, 1997

[54] CAPACITIVE PRESSURE SENSOR WITH HEATED ELECTRODES

[75] Inventors: George Codina, North Hollywood, Calif.; Chandrasekar Ramamoorthy, Normal; Donna J. Murr, Dunlap, both of Ill.

[73] Assignee: Caterpillar Inc., Peoria, Ill.

[21] Appl. No.: 521,601

[22] Filed: Aug. 31, 1995

[51] Int. Cl.$^6$ ........................................ G01L 9/12
[52] U.S. Cl. ................ 73/754; 73/753; 73/724; 73/730
[58] Field of Search .................... 73/718, 724, 730, 73/731, 753, 754; 324/678, 653

[56] References Cited

U.S. PATENT DOCUMENTS

| | | | |
|---|---|---|---|
| 3,595,078 | 7/1971 | Beck et al. | 73/194 |
| 3,635,082 | 1/1972 | Prellwitz et al. | 73/194 |
| 3,802,261 | 4/1974 | Zimmerman et al. | 73/194 |
| 4,074,184 | 2/1978 | Dechene et al. | 324/30 |
| 4,240,028 | 12/1980 | Davis, Jr. | 324/61 |
| 4,266,188 | 5/1981 | Thompson | 324/65 |
| 4,468,611 | 8/1984 | Tward | 324/61 |
| 4,604,904 | 8/1986 | Massen | 73/861 |
| 4,658,208 | 4/1987 | Lee et al. | 324/61 |
| 4,713,603 | 12/1987 | Thorn | 324/61 |
| 4,714,048 | 12/1987 | Jefferies et al. | 119/14.08 |
| 4,751,842 | 6/1988 | Ekrann et al. | 73/61.1 |
| 4,894,604 | 1/1990 | Dowling et al. | 324/690 |
| 4,920,795 | 5/1990 | Codazzi et al. | 73/195 |
| 5,382,942 | 1/1995 | Raffa et al. | 340/457 |

FOREIGN PATENT DOCUMENTS 2747-949  5/1978  Germany ........................... 73/730

OTHER PUBLICATIONS

MC 1455 Timing Circuit, Motorola Semiconductor Technical Data, pp. 11–5 to 11–11.
SAE Technical Paper Series—910497 Feb. 25–Mar. 1, 1991 "A Capacitive Oil Deterioration Sensor".

*Primary Examiner*—Richard Chilcot
*Assistant Examiner*—Joseph L. Felber
*Attorney, Agent, or Firm*—David M. Masterson

[57] ABSTRACT

An apparatus for measuring the pressure of a liquid in a container includes a capacitor formed by a pair of electrodes. A charging circuit produces a charging current of constant magnitude. The charging current is used to charge the capacitor to a predetermined voltage. A timing circuit measures the elapsed time between the time at which the charging circuit begins to produce the charging current and the time at which the capacitor has been charged to the predetermined voltage. The timing circuit produces a pulse width modulated signal. The magnitude of the pulse width modulated signal is indicative of the time difference and thus, the pressure within the container.

2 Claims, 1 Drawing Sheet

CAPACITIVE PRESSURE SENSOR WITH HEATED ELECTRODES

TECHNICAL FIELD

This invention relates generally to a capacitive pressure sensor, and more particularly, to a capacitive pressure sensor which produces a pulse signal whose width is indicative of pressure.

BACKGROUND ART

Pressure sensors for measuring the pressure of liquids are known. Pressure transducers are commonly used. For example, in the earthmoving industry earthmoving machines operate in a highly hostile environment. The machines' work implements are typically powered by hydraulics. One of the problems associated with sensors used in these types of environments is reliability. The hostile environments are harsh on the sensors and reduce the operating life of the sensors.

The present invention is directed to overcoming one or more of the problems, as set forth above.

DISCLOSURE OF THE INVENTION

In one aspect of the present invention an apparatus for measuring the pressure of a liquid in a container is provided. The apparatus includes a pair of electrodes contained within the line and being oppositely spaced, forming a capacitor. A resistor is connected to the capacitor formed by the pair of electrodes. A charging circuit produces a charging current of constant magnitude and charges the capacitor to a predetermined voltage. A timing circuit detects the time at which the charging circuit begins to produce the charging current and the time at which the capacitor has been charged to the predetermined voltage, the magnitude of the pulse width modulated signal is indicative of the elapsed time between the start of the constant current and the time at which the capacitor has been charged to the predetermined voltage.

Best Mode for Carrying Out the Invention

Figure 1:
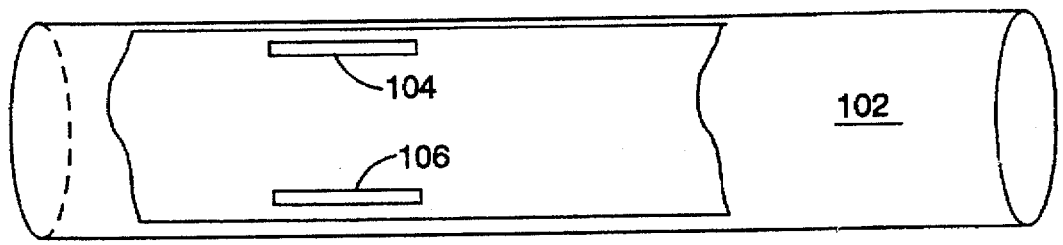
FIG. 1 is a diagrammatic view of a container for containing fluid.

With reference to FIG. 1, the present invention is adapted to measure the pressure of fluid within a container 102. The container 102 refers to any receptacle for containing fluid, or a tube, pipe or similar device for transporting fluid.

Figure 2:
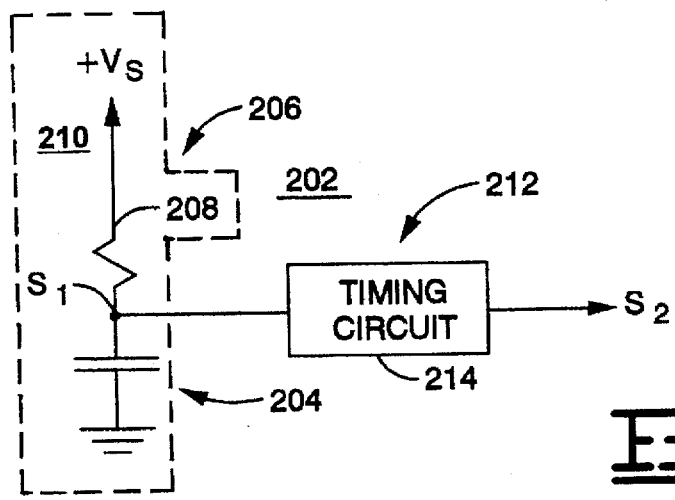
FIG. 2 is a block diagram of a pressure sensor according to an embodiment of the present invention.

With reference to FIGS. 1 and 2, the present invention, apparatus or sensor 202 includes a pair of electrodes. The electrodes 104, 106 are contained within the container 102 and are oppositely spaced so as to form a capacitor 204. The fluid within the container 102 is the dielectric of the capacitor 204. The electrodes may be flat or curved and/or rectangular, triangular, or otherwise shaped.

A charging means 206 is connected to the capacitor 204. The charging means includes a resistor 208 and a voltage source, $+V_s$. The charging means 206 produces a charging current of constant magnitude. The magnitude of the charging current is determined by the resistor 208. The charging current charges the capacitor 204 until a predetermined voltage (V) across the capacitor is reached. Preferably, the resistor 208 is variable to allow for adjustment of the sensor 202. For example to measure pressure, an exemplary charging current, resistor value, and predetermined voltage are 9 microamps, 1 MOhms and 9 volts, respectively. The charging current will vary from system to system and will be determined to minimize or eliminate the effects of other system parameters, e.g., fluid flow, on the charging time.

The effects of fluid temperature variations is preferably minimized by heating the electrodes 104,106.

A timing means 212 is also connected to the capacitor 204. The timing means 212 includes a timing circuit 214. The timing circuit 214 detects the time at which the charging circuit begins to produce the charging current and the time at which the capacitor has been charged to the predetermined voltage. The timing circuit also produces a pulse width modulated signal. The magnitude of the pulse width modulated signal is indicative of the time between the time at which the charging circuit begins to produce the charging current and the time at which the capacitor has been charged to the predetermined voltage and thus, the pressure of the liquid in the container 102. In the preferred embodiment, the magnitude of the pulse width modulated signal is equal to the duration of each pulse.

In the preferred embodiment, the timing means 212 includes an MC1455 timing integrated circuit which is available from Motorola Corp., of Schaumburg IL. The MC1455 circuit advantageously senses when the capacitor 204 has reached the predetermined voltage and responsively discharges the capacitor into electrical ground.

Industrial Applicability

With reference to FIGS. 1 and 2, the present invention is adapted to measure the pressure of fluid within a container 102.

Figure 3:
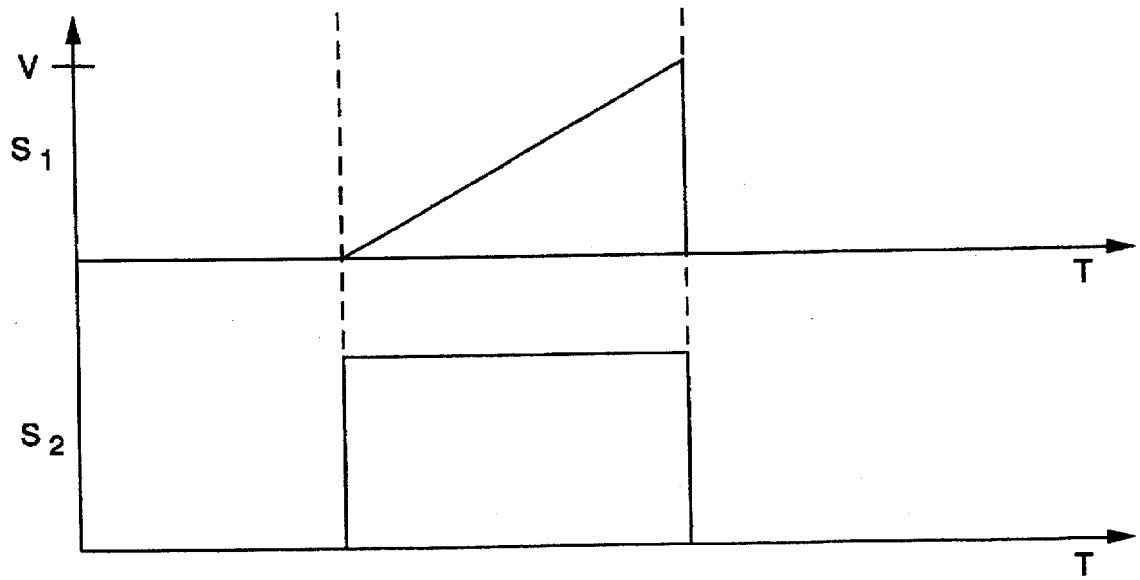
FIG. 3 is a graphical illustration of relevant signals within the pressure flow sensor of FIG. 1.

With reference to FIG. 3, the operation of the sensor 202 is discussed below. The charging circuit 210 produces a charging current. The charging current has a constant magnitude. The charging circuit 210 via the charging current charges the capacitor 204 until it reaches a predetermined voltage, at which time the charging current is stopped and the energy stored in the capacitor is allowed to dissipate. $S_1$ refers to the voltage across the capacitor 204.

The timing circuit 214 detects the time at which the charging circuit 210 begins to supply the charging current and detects the time at which the capacitor 204 has reached the predetermined voltage level. The timing circuit 214 produces a pulse width modulated signal ($S_2$). Each pulse has a duration equal to the difference between the time at which the charging circuit 210 begins to supply the charging current and the time at which the capacitor 204 has reached the predetermined voltage level.

If pressure is constant within the container 102, the difference between the time at which the charging circuit 210 begins to supply the charging current and the time at which the capacitor 204 has reached the predetermined voltage level or duration of the pulses would be constant. The rate at which the capacitor 204 is charged is dependent upon the surface area of the electrodes, the distance between the electrodes, and the dielectric. However, the amount of dielectric or number of charged particles per unit volume between the two electrodes 104,106 varies with pressure. The dielectric compresses with increasing pressure. The higher the pressure, the more dielectric between the two electrodes 104,106. The more dielectric, the higher the capacitance, resulting in a longer pulse. Preferably, the output pulse width is compared to a reference pulse width which corresponds to a known pressure. The difference between the output pulse width and a reference width is used as an indication of the pressure.

Other aspects, objects, and features of the present invention can be obtained from a study of the drawings, the disclosure, and the appended claims.

We claim:

1. A method for measuring the pressure of a liquid flowing through a container using a capacitor formed by a pair of electrodes contained within the container and being oppositely spaced, including the steps of:

heating said pair of electrodes to minimize the effects of temperature variations;

producing a charging current of constant magnitude and charging the capacitor to a predetermined voltage; and detecting the time of start of said constant current and the time at which the capacitor has been charged to said predetermined voltage and producing a pulse width modulated signal, the magnitude of said pulse width modulated signal being indicative of a charging time, said charging time defined as the time between the start of said constant current and the time at which the capacitor has been charged to said predetermined voltage and being indicative of the pressure of the liquid flowing through the container, a magnitude of said charging current chosen to minimize the effects of other parameters on said charging time.

2. A method, as set forth in claim 1, wherein said other parameters includes fluid flow.

* * * * *